Feb. 16, 1960 F. L. DILLINGHAM 2,925,106
LOG-DEBARKING HEAD MOUNTED ON TRAVELING CARRIAGE
AND PIVOTABLE ABOUT TWO MUTUALLY TRANSVERSE AXES
Original Filed Feb. 23, 1954 9 Sheets-Sheet 1

INVENTOR.
F. L. Dillingham
BY
Glascock Downing + Seebold
Attorneys.

Feb. 16, 1960 F. L. DILLINGHAM 2,925,106
LOG-DEBARKING HEAD MOUNTED ON TRAVELING CARRIAGE
AND PIVOTABLE ABOUT TWO MUTUALLY TRANSVERSE AXES
Original Filed Feb. 23, 1954 9 Sheets-Sheet 3

INVENTOR.
F. L. Dillingham
BY
Glascock Downey & Seebold
Attorneys.

Feb. 16, 1960 F. L. DILLINGHAM 2,925,106
LOG-DEBARKING HEAD MOUNTED ON TRAVELING CARRIAGE
AND PIVOTABLE ABOUT TWO MUTUALLY TRANSVERSE AXES
Original Filed Feb. 23, 1954 9 Sheets-Sheet 4

Feb. 16, 1960     F. L. DILLINGHAM     2,925,106
LOG-DEBARKING HEAD MOUNTED ON TRAVELING CARRIAGE
AND PIVOTABLE ABOUT TWO MUTUALLY TRANSVERSE AXES
Original Filed Feb. 23, 1954     9 Sheets-Sheet 5

INVENTOR.
F. L. Dillingham
BY
Glascock Downing & Seebold
Attorneys.

INVENTOR.
F. L. Dillingham
BY
Glascock Downing & Seebold
Attorneys.

Feb. 16, 1960 F. L. DILLINGHAM 2,925,106
LOG-DEBARKING HEAD MOUNTED ON TRAVELING CARRIAGE
AND PIVOTABLE ABOUT TWO MUTUALLY TRANSVERSE AXES
Original Filed Feb. 23, 1954 9 Sheets-Sheet 7

INVENTOR.
F. L. Dillingham
BY
Glascock Downing & Seebold
Attorneys.

United States Patent Office 2,925,106
Patented Feb. 16, 1960

2,925,106

LOG-DEBARKING HEAD MOUNTED ON TRAVELING CARRIAGE AND PIVOTABLE ABOUT TWO MUTUALLY TRANSVERSE AXES

Frederick Laurence Dillingham, Sylacauga, Ala., assignor to Soderhamn Machine Manufacturing Co., Talladega, Ala., a corporation of Alabama Original application February 23, 1954, Serial No. 411,823, now Patent No. 2,795,320, dated June 11, 1957. Divided and this application August 23, 1956, Serial No. 605,883

12 Claims. (Cl. 144—208)

This invention relates to the art of debarking logs and this application is a division of my prior-filed application, Serial Number 411,823, filed February 23, 1954, now Patent No. 2,795,320, granted June 11, 1957, and entitled Apparatus for Handling Cylindrical Objects.

In the art of removing bark from logs, there are presently utilized numerous different types of machines. In some, the log to be debarked is fed while it is restrained against rotation and a debarking means known as a rotary head rotates on a horizontal axis and the log is fed through the head. This rotary-head-type debarking means can incorpoate debarking tools which can be actuated in accordance with the principles set forth in Andersson Patent 2,623,558, issued December 30, 1952, or the head can embody a fluid-jet arrangement to remove the bark by impact of fluid jets under high pressure.

In other debarking machines, a log is held against longitudinal movement and is rotated about its own axis and debarking tools, or jets if a fluid-type machine is used, traverse the log longitudinally thereof. Within this sphere of debarking is also embodied machines in which rotary-balde means, in the form of knives, are traversed longitudinally of the log while the latter rotates.

It is thus clear that each type of debarking machine of the broad category set forth above entails a particular problem in handling the log and consequently the log-handling or feed means must be constructed and correlated with the particular type of debarking arrangement that is utilized. This factor holds constant regardless of whether the debarking tool is knife-edged and removes the bark by cutting action or whether it is a blunt-type tool as disclosed in the above-mentioned Andersson patent. In other types of debarking machines such as embodied in Carpenter, 2,601,261, issued June 24, 1952, a rotary demarking head of the flail type is embodied with respect to which logs are slowly fed and rotated. This type arrangement requires a particular feed or log-handling construction that would not be adaptable for utilization with the other types mentioned above, and is not adapted to operate on logs of widely different diameters. Thus the art is replete with numerous debarking arrangements each of which requires a feed or log-handling mechanism correlated wtih the particular type of debarking action.

It is an additional object to provide an improved debarking machine in which a universal feed mechanism cooperates with an improved debarking means to effect more efficacious removal of bark from logs.

As a further and more particular object, this invention provides an improved debarking machine incorporating an improved means to traverse the debarking mechanism.

A further particular object includes the provision of an improved flail-type debarking head.

Further and more particular objects will be apparent from the following description taken in connection with the accompanying drawings in which like characters of reference denote the same or similar parts in all figures, and in which:

Figure 4 is an end view partly in section along lines 4—4 of Figure 5 illustrating an electrically driven debarking mechanism, including fluid-operated position-adjusting means, Figure 5 is a view of the debarking mechanism of Figure 4 as seen from the rear, Figure 6 is a perspective view illustrating a modified form of debarking mechanism, Figure 7 illustrates a detail of the form shown in Figure 6, Figures 8 and 8a partially illustrate one form of flail construction, Figures 9 and 9a partially illustrate a modified flail construction, Figures 10, 11 and 12 diagrammatically illustrate a pair of the spheroidal supporting members in different adjusted positions.

While the drawings illustrate the invention and while the claims hereinafter set for at least in part specifically comprehend a flail-type debarking head, it is to be understood that the phases of the present invention particularly related to log handling can be operably associated with rotary-type debarkers such as in the Andersson patent mentioned above or rotary or other jet-type debarkers.

Figure 1:
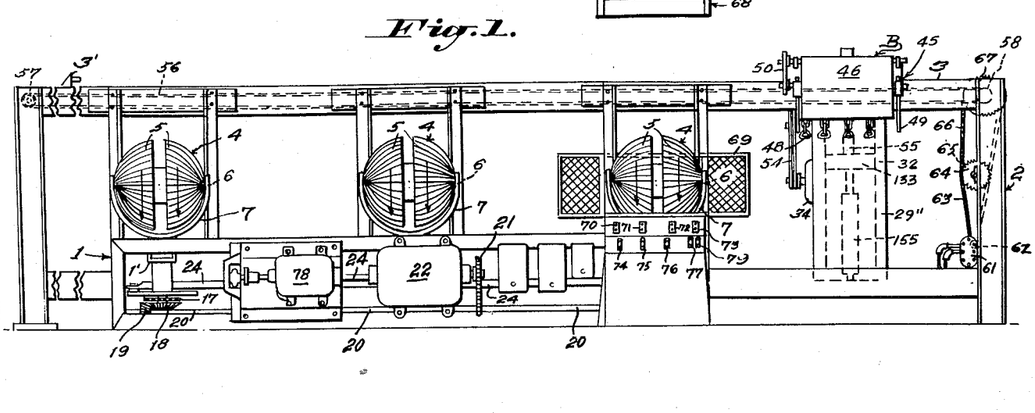
Figure 1 is a side elevation of a form of the invention as embodied in a debarking machine constructed in accordance with the invention.

Figure 1 illustrates a debarking machine that is electrically driven and which includes a first frame structure denoted broadly at 1 which supports the improved log-supporting and handling means and embodies the drive components therefor and a second frame structure noted at 2 which is vertically disposed and extends longitudinally of the line of travel of the log. The frame structure 2 includes an upper horizontal supporting rail 3, Figure 2, upon which a demarking mechanism denoted diagrammatically at B is longitudinally movable. The details of the debarking mechanism and the drive therefor and the means for traversing the same along the rail 3 will be described hereinafter.

Figure 2:
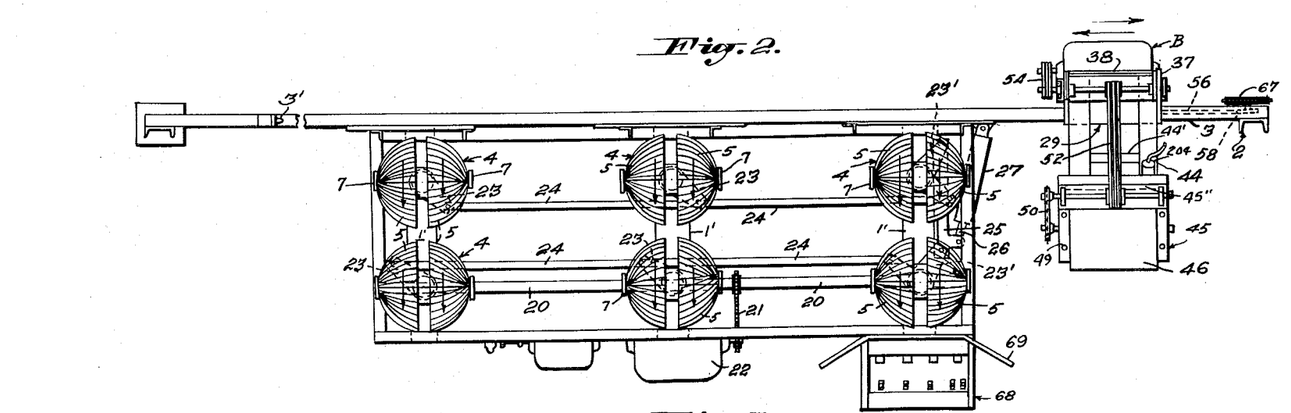
Figure 2 is a top plan view of the arrangement illustrated in Figure 1 with parts removed.
Figure 3:
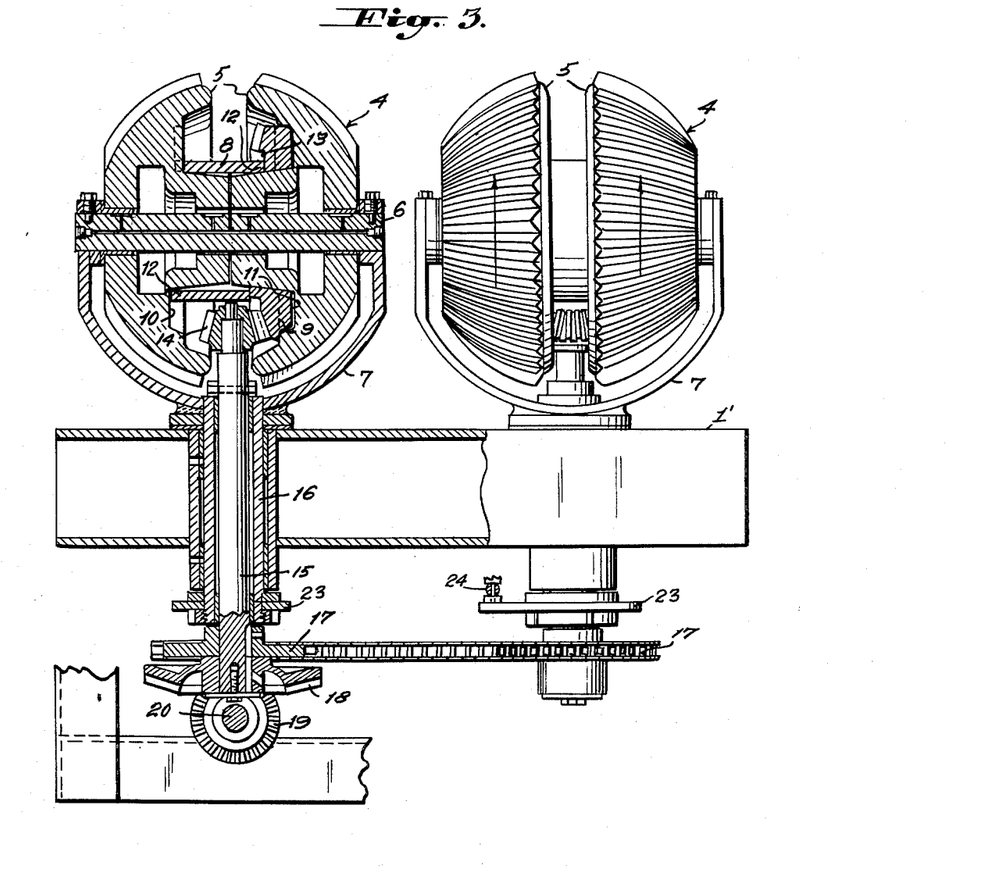
Figure 3 is a fragmentary view partly in vertical section and on an enlarged scale of a pair of supporting members as seen from the right in Figure 1, but illustrating the ball-supporting yokes rotated 90° clockwise about a vertical axis from their positions shown in Figure 2.

The logs to be debarked are fed from right to left as viewed in Figures 1 and 2 by conventional fluted roller or other type log conveyors, not shown. The logs then enter the sphere of action of the log-supporting and handling means of the invention which in the form illustrated includes plural pairs of supporting members 4, each pair includes two substantially spheroidal ball elements each comprising substantially hemispherical elements 5. The elements are approximately 18″ in diameter, in a practical construction, and spaced so that their centers are approximately 22" apart, so that two spherical elements will cradle a log therebetween. The outer surfaces of the hemispheroidal elements 5 are fluted or toothed to provide log-gripping surfaces. The teeth are approximately ¾" in height, 1" wide at the base and the bases are spaced approximately ½" at the largest diameter of the spherical component but the spacing between the bases and the width of each base will decrease toward the axis of the ball elements. This axis of rotation is horizontal and is provided by a shaft 6 which is supported by a yoke element 7, Figure 3. The ball halves are journaled on the shaft 6 and are connected to one another by a cylindrical sleeve 8 and an annular bevel gear 9. The ball halves on their inner faces are provided with depressions 10 which respectively receive lugs 11 on an outer face of the gear 9 and teeth 12 on one end of the spacer sleeve. A further set of teeth 12 on an opposite end of the spacer fit in depressions 13 on the inner or bevel face of the gear 9. Thus as shown in Figure 3, the right-hand ball half is coupled to the gear 9 which in turn is coupled to the spacer 8 and the latter is coupled to the left-hand ball half so that rotation of the gear 9 will drive both ball halves about the shaft 6 in the same direction. The gear 9 is driven by a bevel gear 14 carried by a vertical shaft 15 positioned coaxially within a vertical sleeve 16 that is connected to the yoke 7. The shaft 15 is longer than the sleeve 16 and thus projects therebeneath and carries on its lower end a sprocket wheel 17 and a bevel gear 18 provided in association with one ball member of each pair. The bevel gears 18 are driven by co-operating bevel gears 19 fastened to a line shaft 20 which receives drive from a sprocket drive 21 driven by an electric motor 22. Thus in the arrangement shown, the ball on the left-hand side of the axis of the line of feed as viewed from the right of Figure 2 is directly driven from the line shaft 20. The companion ball of each pair is driven through a sprocket drive at 1-1 ratio including the sprockets 17 splined to the vertical shafts 15. The sleeves 16 have mounted thereon lever means 23 and all of the lever means on each side of the longitudinal axis of the machine are coupled by links 24. The lever means at the infeed end of the machine are bell-crank levers 23'. These bell-crank levers are connected together by a link 25 which is rocked by the piston 26 of a hydraulic or other fluid-type motor 27. In the position illustrated in Figures 1 and 2, the balls or spheroidal supporting elements are shown adjusted in that position in which each shaft 6 is parallel to the longitudinal axis of the machine from which it follows that a log supported on the three illustrated sets of supporting members will only rotate about its own axis. The drive to the balls rotates the same counterclockwise as viewed from the right end of Figures 1 and 2 so that a log supported thereon will rotate clockwise as viewed from that end of the machine. The drive for the flail is such that the rotary shaft thereof rotates counterclockwise.

To feed a log forwardly, the yokes are turned 90° clockwise about a vertical axis from their positions in Figure 2 to the positions shown in Figure 3 so that the shafts 6 lie transversely of the line of feed and the balls rotate counterclockwise as viewed from the operator's side (the nearmost side in Figure 1), or from the left side of Figure 3. In intermediate positions of adjustment of the shafts 6 as set forth hereinafter, the balls rotate to feed a log from right to left in the drawings while turning it clockwise about its axis. The linkage connecting the yokes for simultaneous turning is further so designed that the axes of shafts 6 can be turned through an angle of 110° more or less to permit retrograde and rotary movement of logs as desired. Therefore, the co-operation of the debarking means regardless of the type that are embodied on the carriage that goes along the rail 3 with the log to be debarked can be correlated by the selectivity of movement of the debarking means and the balls. For example, if bark is particularly tenacious, the barking mechanism B can be held stationary while the log is merely rotated on its axis or the log can be stopped in a selected position with the debarking means stationary or movable along a stationary log if there is a longitudinal hollow therein. In the position shown in Figure 2, it is assumed that the debarking mechanism has been traversed relative to the frame 1 from a stop 3' back to the right-hand or infeed end and the log that has just been debarked is then removed by actuating the hydraulic motor 27 to move the links 24 to rock the levers 23 and thus turn the yokes of each pair and the ball means supported thereby in unison from a position shown diagrammatically in Figure 12 to the position shown in Figure 10, which will cause outfeed of the log to the left, and which corresponds to the position shown in Figure 3. If desired, the ball members during debarking can be adjusted to an intermediate position as indicated in Figure 11 where the log is fed to the left and rotated clockwise as viewed from the right. The speed of advance of the log and the rotation of the log is determined by the angle through which the yokes are turned and the speed of rotation of the ball members. Thus as an example, with balls of 18" diameter, the machine will handle logs from 8 to 14' long with only two sets of balls as supporting elements at a feed speed of for example 40 linear feet per minute. If the logs are from 14 to 20' in length, three sets of balls may be desirable. Thus the size and number of the ball members may be correlated with the length and diameter of the log to be debarked, since log diameters of over 30" or more may require larger spherical support elements and stronger drives and frame components.

The horizontal frame 1 includes a series of cross struts 1' which provide an adequate support for each vertical shaft 15 and sleeve 16. As illustrated in Figure 1, these struts are box-shaped girders.

Figures 4, 8:
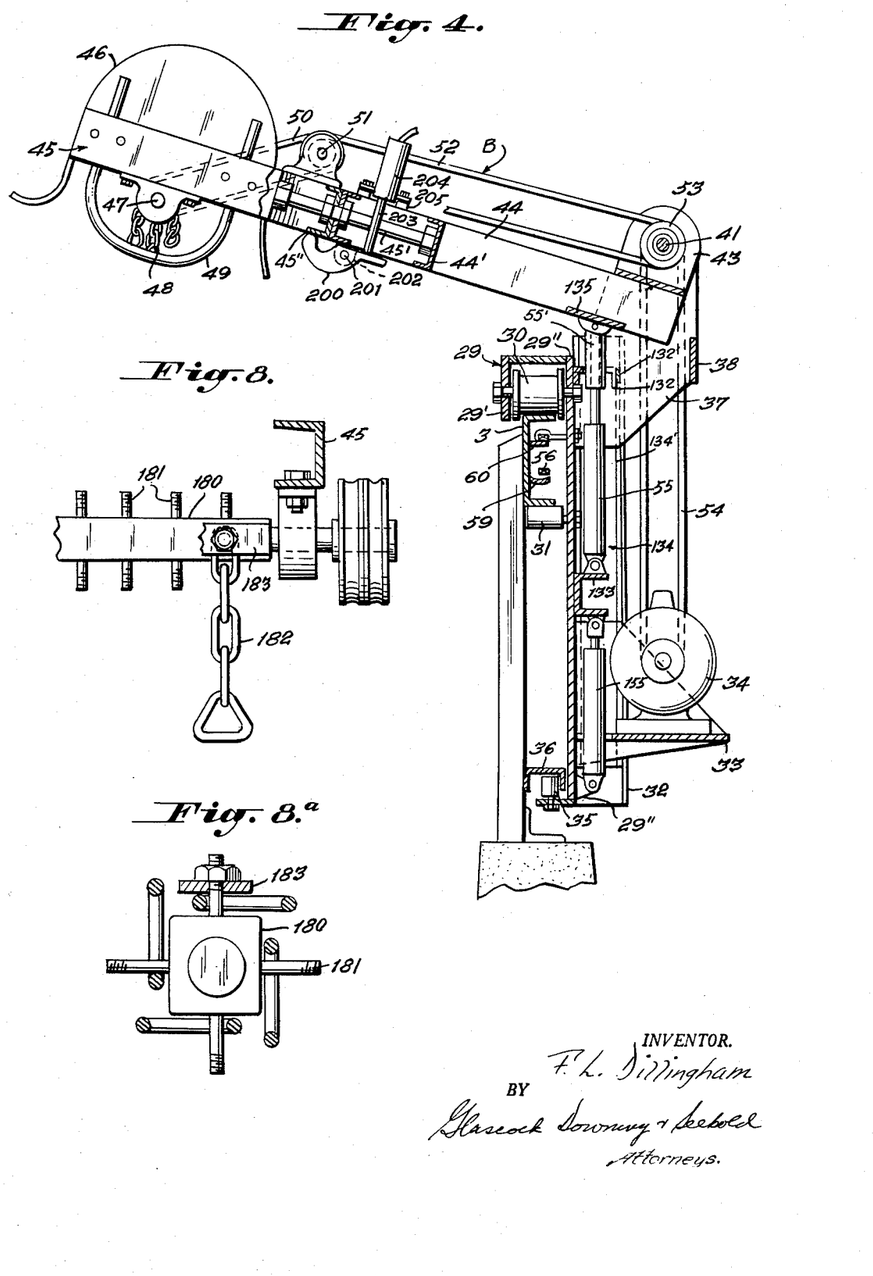
Figures 5, 9, 9A:
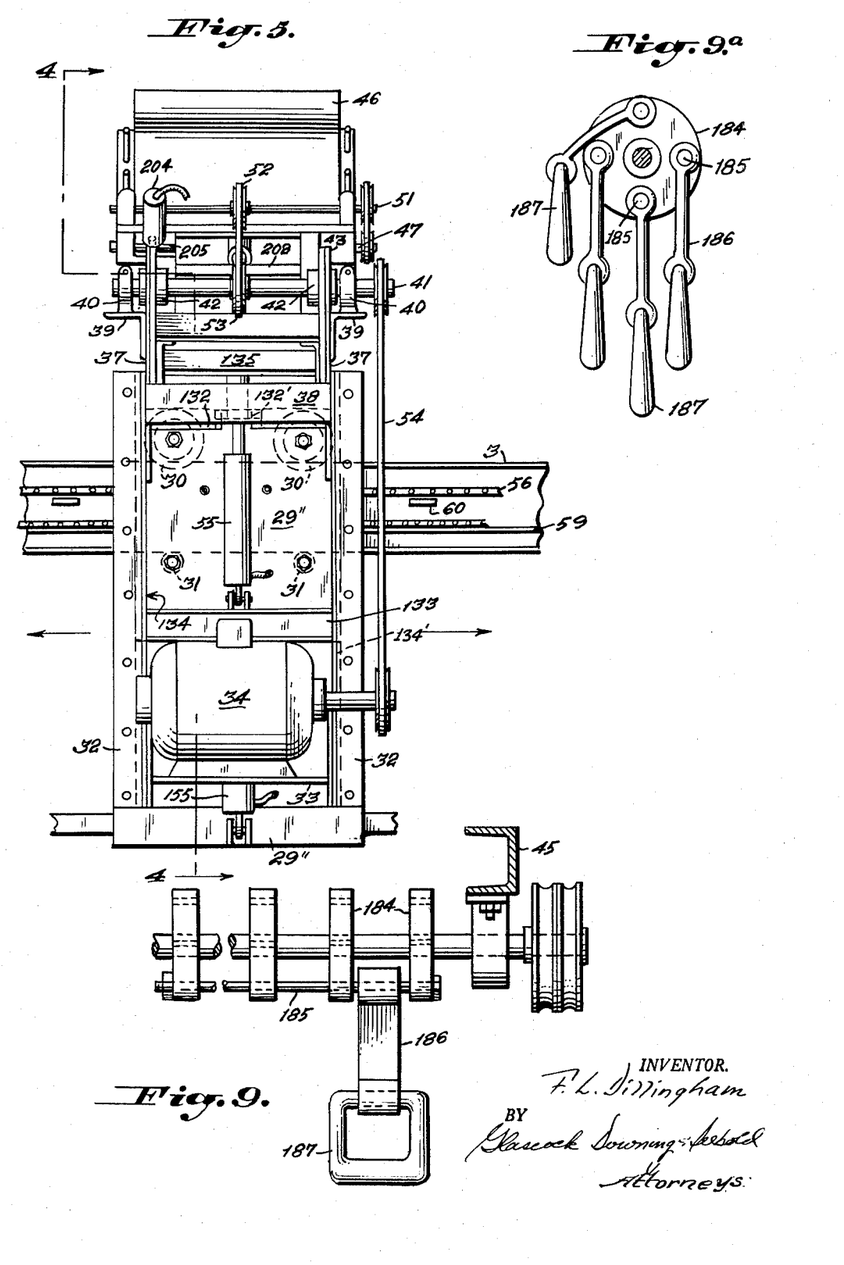

One form of the debarking mechanism and its supports are better illustrated in Figures 4 and 5. The horizontal rail 3 forms a track which in effect includes vertically spaced rails for supporting a carriage 29. This carriage includes front and rear plates 29' and 29", a top set of flanged rollers 30, of which there are at least two, and a similarly arranged lower set of rollers 31 respectively engaging the upper and lower flanges of the horizontal rail and supporting the carriage for rolling movement. Secured to the rear plate 29" of the carriage 29 are spaced vertical guides 32. Slidably mounted for vertical movement between the guides is a slide 134 including upper and lower transverse braces 132 and 133 respectively connected to vertical components 134' of the slide 134. Adjacent the top of slide 134 there are fixed laterally spaced supporting plates 37. Carried by the lower end of the slide is a platform 33 supportnig an electric motor 34 for driving the debarking means. One or more antifriction rollers 35 are mounted on the rear plate 29" and engages inside the vertical flange of a lower rail 36 to stabilize the carriage. The upper part of the slide has the two supporting plates 37 projecting from the rear face thereof and secured to the vertical components of slide 134. These supporting plates are interconnected by a transverse web 38 and at their upper portions are provided with aligned apertures. A bracket element 39 is mounted on the outer face of each of the support plates and supports a pillow block 40 for journalling a shaft 41. Within the apertures of the supporting plates 37 are fixed sleeve elements 42 which rotatably support boss members 43 carried by respective arms 44 of the frame of the debarking head for vertical tilting movement of the frame to allow the head to be raised out of the path of an oncoming log. These arms 44 are connected by cross webs 44' and their outer ends support the frame 45 which houses the rotary debarking means for rocking movement about a pivot pin 45' to accommodate variations in slop which may occur along the surface of a log. The frame 45 includes a protecting shield 46. The frame and shield house a rotatable horizontal shaft 47 which carries a plurality of chain flail elements 48, Figure 1, which effect debarking action. A pair of vertically adjustable guard or rider bars 49 depend on opposite sides from the frame 45 to ride on the surface of the log being debarked and assure maximum efficiency of the chain flails. A chain or belt drive 50 connects the shaft 47 with a further horizontal shaft 51 driven by a belt 52 from a furher pulley 53 carried by shaft 41. The shaft 41 is driven by a belt 54 from the motor 34. As pointed out the axis of shaft 41 is the axis about which he debarking head may tilt vertically. A fluid cylinder-and-piston motor 55 has its cylinder pivotally connected to the top of the horizontal brace 133 on the slide and its piston slidably received in a sleeve 55' which is pivotally connected to the underside of a cross brace 135 that extends between the arms 44. This sleeve 55 is movable through a cutout portion or slot in the top horizontal brace 132 and a strap member 132' prevents the sleeve from becoming disassociated from the cross brace and also reinforces the brace. The fluid motor 55 can swing the frame of the debarking head upwardly while the weight of the head will cause the frame to swing down whenever fluid is being released from the underside of the piston of the motor. This fluid motor 55 functions to raise the frame of the debarking head high enough to let a log pass thereunder. To raise and lower the debarking mechanism including its frame, to accommodate logs of different diameters, a double-acting fluid motor 155 is connected between the lower end of the rear plate 29" of the carriage and the under surface of the horizontal brace 133. This motor is operative to adjust the vertical height of the slide and the deparking frame while the motor 55 is operable to raise the debarking frame relativeto its initial vertically adjusted position. The tilting action effected by the motor 55 will accommodate logs of from 5 to 28" in diameter while the slide will permit adjustment of the head to accommodate logs of about 40" in combination with the rocking action.

In order to control the rocking movement of the frame 45, that accommodates the flail, about the shaft 45' a pair of transversely spaced lift fingres 200 (only one being shown in Figure 4), are splined to a shaft 201 that is journaled within a sleeve 202 which is welded or otherwise rigidly secured to the underside of the arms 44 to extend transversely thereof adjacent the inner end of frame 45. These lift fingers include a lifting nose underlying a transverse component 45" of the frame 45 and a rearwardly extending arm that is controlled by a piston 203 of a single-acting fluid motor 204 that is fastened to a plate 205 which in turn is fastened to the top of one of the arms 44. A very strnog spring within the cylinder 204 acts to lift the piston 203 upwardly. This arrangement is such that when fluid is admitted to the cylinder 204 the piston 203 is projected to engage a rearwardly extending arm on one of the fingers 200 so as to rock the shaft 201 and thus engage the pair of lift fingers 200 against the underside of frame 45 to hold the shaft 47 horizontal when the flail head is passing off the end of a log or being brought into engagement with the end of another log. A suitable foot-operated valve, not shown, provides the control of the fluid to the cylinder 204. When the flails are engaging a log during debarking, fluid is not admitted to the cylinder 204 and the spring lifts piston 203 upwardly allowing the lift fingers to tilt downwardly and thus permitting the frame 45 to rock about shaft 45' to accommodate irregularities in log or bark contour. The rearwardly extending arms of lift fingers 200 engage stops, not shown, to limit the degree of rocking movement of the frame 45 about the shaft 45'. It is to be pointed out that during debarking one guard 49 will ride on the bark and the opposite one will ride on the wood from which bark has been removed, thus guards are at different vertically adjusted positions to accommodate for the thickness of the bark and maintain the axis of shaft 47 substantially horizontal. If a very large encumbrance or projection strikes the guard during debarking so that the rocking action of head 45 alone is not sufficient to clear this projection the head will pivot about the shaft 41 since the loosely slidable connection between the sleeve 55' and the piston of the motor 55 will accommodate this action. Thus the lift fingers 200 limit the degree of rocking movement of the head 45 about the shaft 45', and the cylinder 204 constitutes a position lock for locking the frame 45 relative to the arms 44.

To traverse the debarking head, the invention provides a chain-drive mechanism in the form illustrated in Figures 1 and 2. The chain is illustrated at 56 and passes over spaced sprocket wheels 57 and 58 provided in the opposite ends of the horizontal rail 3. The carriage 29, as shown in Figure 3, is connected to the upper run of the chain the lower run of which is guided by a supporting ledge 59. Plural lugs 60 extend along the side of the rail 3 and support the upper run of the chain. It is thus clear that movement of the chain in either direction will move the carriage 29 and thus the debarking mechanism. To drive the chain there is provided a reversible fluid motor 61 having an output shaft carrying a sprocket 62 about which is trained a chain 63 connected to a further sprocket 64 mounted on a vertical upright part of the frame 2. An additional sprocket 65 is mounted for rotation with the sprocket 64 and a chain 66 passes over a further sprocket 67 which drives the sprocket 58 and thus the chain. This chain-and-sprocket drive is in effect a speed-reducing gear arangement. Any alternative reducing gear drive known in the art could be utilized in lieu of the chain-and-sprocket drive illustrated.

Adjacent the inlet end of the feed mechanism is a control panel 68 which includes screenlike shield portions 69 to protect the operator. The controls are illustrated diagrammatically and embody mechanisms well known in the art for controlling the various operations. The panel is shown as including four switches 70, 71, 72 and 73 and five control levers 74, 75, 76, 77 and 79. The switch 70 and the control lever 74 control the motor 22 and thus the drive for rotating the ball members 5 about the shafts 6. The switch 71 and control lever 75 control a pump combination 78 which supplies fluid for the hydraulic motor 27 that controls the indexing or positioning of the balls. The switch 72 and the control 76 control the motor 34 that drives the flail. A switch 73 controls a further electric pump combination, not shown, which supplies fluid for actuating the fluid motor 61 and controlling the fluid motors 55 and 155 under control of the control elements 77 and 79 respectively. Obviously other type control arrangements could be utilized, it being understood that the mechanism for rotating the balls and indexing the same constitutes a workable unit independent of any debarking action it it is desired to use the co-operation of the ball elements for manipulating elongated cylindrical objects other than logs.

It is thus clear that the operator can move the debarking mechanism B along the rail 3 as required if the debarking action is such that the balls are adjusted to the position shown in Figure 1 and in effect the log will rotate while the debarking means traverses the same. The operator can control the vertical position of the actual debarking head, that is, the flail end of the carriage, by controlling the fluid motor 55, 204 and 155 and the controls for the motor 27 govern the positions of the link and lever system that effect the indexing of the ball elements.

Figures 6, 7:
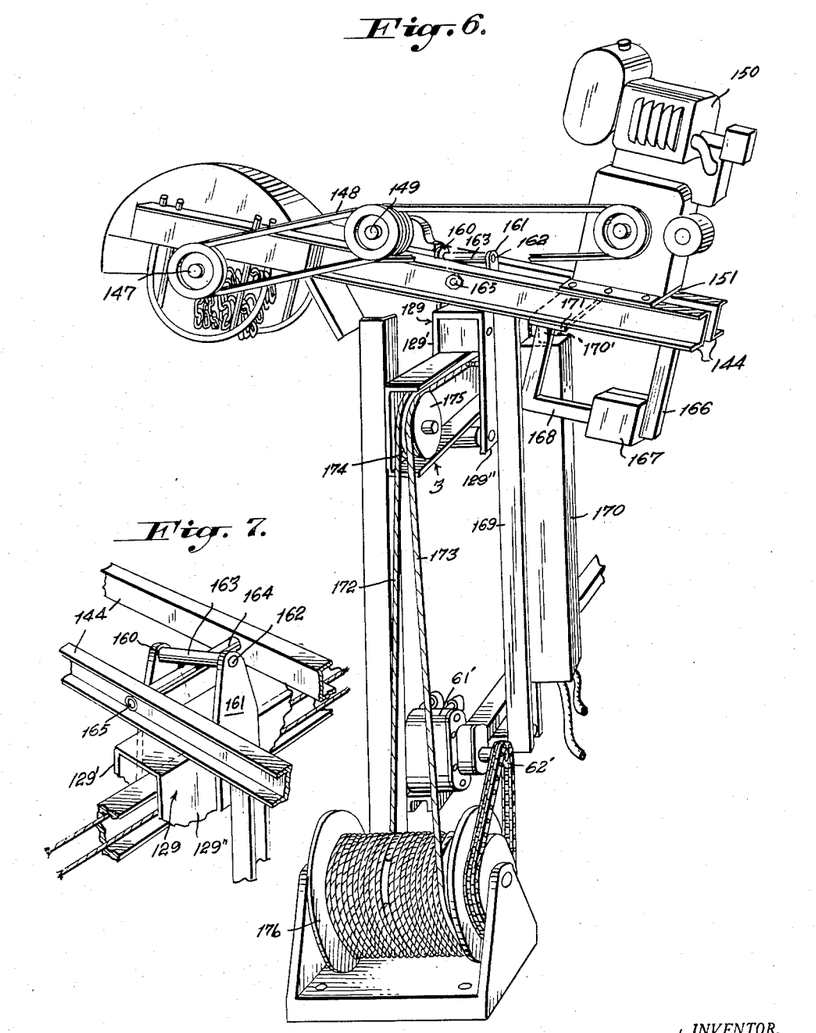

Figures 6 and 7 illustrate the modified form of the debarking mechanism with particular reference to the mounting and drives therefor. In this form, a roller carriage 129 has upper and lower sets of rollers similar to the form shown in Figures 4 and 5 which support the carriage for traversing movement along the rail 3. Projecting upwardly from front and rear plates 129' and 129" of the roller carriage are vertical extensions 160 and 161. These extensions are apertured and receive a pivot pin 162 which pivotally supports the debarking mechanism for rocking movement about an axis perpendicular to a vertical plane through the rail 3. The actual supporting components for the debarking mechanism include a sleeve 163 mounted about the pin 162. Welded or otherwise rigidly fastened to the sleeve 163 is another sleeve 164 which extends at right angles thereto and lies in a plane parallel to the rail 3 and above the same. A further pivot pin 165 passes through the sleeve 164 and is secured to respective arms 144 of the frame of the debarking mechanism. This frame has at one end, that is the end overlying the log-handling mechanism, a debarking head similar to the arrangement of Figures 4 and 5 including the vertically adjustable guard bars, the chain flail and a rotatable shaft 147 driven by a belt or chain drive 148 from a horizontal shaft 149 mounted in pillow blocks on top of the arms 144. The shaft 149 is driven by a suitable belt or chain drive from a gasoline engine 150 supported on a transverse platform 151 welded or otherwise rigidly mounted on the arms 144 near their rear ends. This gasoline engine also functions as part of a counterweight. Depending from the arms 144 rearwardly of the pivot pin 165 is a frame 166 which supports adjustable counterweights 167 which are adjustable on a lower element 168 of the frame 166. Mounted on the rear plate 129" is a vertical strut member 169 which includes at its lower end means to engage a lower rail similar to the arrangement of Figures 4 and 5. Also mounted on this strut 169 is a spring-supported, housed fluid motor 170, a piston 170' of which engages the underside of a transverse brace 171 that connects the arms 144. The piston is connected to this transverse brace by a ball-and-socket arrangement, not shown. It thus follows that the actuation of this fluid motor 170 will raise and lower the debarking mechanism about the axis of pin 165 while permitting the debarking head to rock about the axis of pin 162 as required by surface irregularities in the log to be debarked. The fluid motor 170 will further hold the debarking mechanism in active engagement with the log being debarked in a yieldable manner.

To traverse the mechanism a reversible fluid motor 61' and sprocket 62' similar to the fluid motor 61 and sprocket 62, drives through a suitable chain or belt drive a winch drum 176. Two cables 172 and 173 are fastened to the drum and wound thereover in opposite directions and pass over sheaves 174 and 175 located on a vertical upright on the frame 2 at one end of rail 3. The cable 172 passes over the sheave 174 thence through the roller carriage 129 and around a sheave, not shown, at the remote end of the rail, and its return portion is fastened to the carriage 129. The other cable passes over the sheave 175 and is then secured to the near side of carriage 129. Thus depending on the direction of rotation of the drum 176 the carriage 129 and the debarking mechanism carried thereby traverses the rail 3 relative to the log-handling mechanism.

This form of the invention thus contemplates a gasoline engine for driving a flail, and a mounting for the debarking head which permits rocking and tilting movements thereof about two axes at right angles to one another. The tilting about the axis 165 parallel to the rail 3 is accomplished by the fluid motor 170 while the head automatically rocks about the axis 162 perpendicular to the rail 3.

In connection with the ball-rotating drive 20 illustrated in Figures 1 and 2, a gasoline engine can be substituted for the electric motor 22.

Further, it is to be understood that instead of multiple motors operating separate pumps for the several fluid motors a single pump and receiver including a pressure-relief-valve arrangement can be utilized which can be driven by a gasoline or electric prime mover.

Figures 8 and 8a illustrate one form of the flail chain that may be embodied with the debarking heads described hereinbefore. In this form the horizontal shaft driven by either the gasoline engine or the electric motor associated with the debarking mechanism includes a square central portion 180 extending between the sides of the debarking head and outer journaling portions. This squared central portion 180 has a series of studs 181 projecting outwardly from each side thereof. Over each stud is mounted the end link of a flail chain element 182 which includes four oval links and one triangular log-engaging link at the free end. Overlying each row of studs is an apertured strap member 183 held in place by nuts engaging the respective studs. The end triangular link is such that one of its sides engages the log surface in a debarking operation substantially parallel to the axis of the log.

Figures 9 and 9a illustrate a further form of the debarking elements in which the rotatable horizontal shaft includes a series of discs 184, each of which is apertured in a direction parallel to the shaft axis to receive rods 185. In the arrangement illustrated, there are four rods approximately 90° apart although a different numerical arrangement of rods can be utilized. Between each pair of discs and on each rod is a series of flail elements. Each flail element includes a substantially rectangular and flexible link 186. This link is moulded or extruded of reinforced rubber or plastic. At the free end of each flexible link is mounted a substantially rectangular metal link 187. The free and log-engaging side of the metal link is of greater diameter than the side that is mounted in the flexible link so that it will wear longer and have a lower center of impact. This form of flail has numerous advantages over conventional chain flails, among which is the fact that the flail elements cannot become entangled and the metal links will always be presented to the log surface with the side thereof parallel to the log axis.

Figure 10:
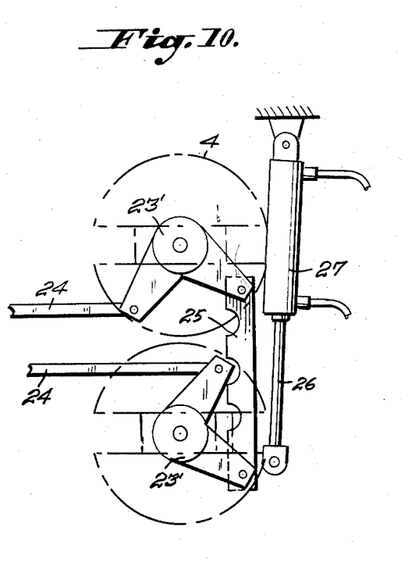
Figure 11:
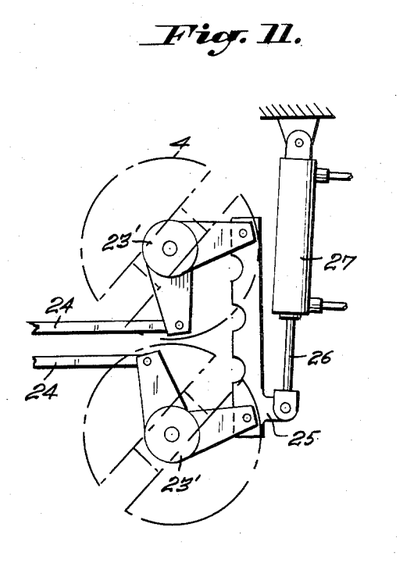
Figure 12:
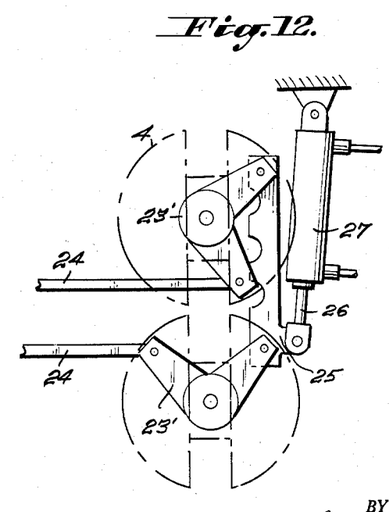

Figures 10, 11 and 12 diagrammatically illustrate the log-handling means shown in Figures 1 to 3. In Figure 10 the ball members 4 are adjusted to the positions shown in Figure 3 so that their axes of rotation are perpendicular to the longitudinal axis of a supported log from whence it follows that a log will be fed from right to left by the counterclockwise rotation of the corrugated ball members as viewed from the front of the machine. Figure 11 illustrates an intermediate position of the ball members following actuation of the fluid motor 27 such that each of the axes of rotation of the balls is at an angle to the axis of the machine whereby the log will be simultaneously fed and rotated about its axis. In Figure 12 there is illustrated the position shown in Figures 1 and 2 in which the axes of the balls are parallel to the longitudinal axis of a log supported thereon, and such log will merely be rotated on its own axis without any feeding movement.

It is to be understood that the link-and-lever relationship that couples the ball members for simultaneous movement as shown in the drawings permits a further turning of the balls about their vertical axes in order to provide for retrograde movement of a log or other supported cylindrical article.

It is further to be understood that the mechanism as described and illustrated herein, while primarily intended for manipulating logs, is adaptable for manipulating and handling elongated cylindrical objects such as poles, ship masts, pipe, and rolls of merchandise such as linoleum and the like. Obviously, where necessary, the corregations can be omitted or covered or cushioned so as not to mar the surface of any object being handled.

It is therefore clear that this invention comprehends a mechanism for manipulating elongated objects including at least two longitudinally aligned transversely spaced pairs of spheroidal supporting elements, means for rotating the elements about horizontal axes and means for turning the elements about vertical axes. Specifically, the elements each include space hemispheroidal members that are fluted or corrugated. A fluid-operated link-and-lever system couples the elements for movement about their vertical axes and gear means including a gear mounted within the elements rotate the same about their horizontal axes.

As specifically applied to a debarking mechanism, the invention comprehends the combination of the aforedescribed manipulating mechanism with a horizontal trackway extending along one side thereof, and a mobile debarking means which is carried on the trackway and which includes a frame carrying a debarking head and means mounting the frame for rocking and tilting movement toward and away from the ball members about two axes.

It is to be further understood that the log-manipulating mechanism comprised essentially by the frame and the pairs of spheroidal supporting elements mounted thereon, is usually operably associated with a log haul which includes a feed and discharge grouping of fluted rollers which are conico-frustum in shape from their outer ends to their centers, or of hour-glass shape between their outer ends. The rollers, depending on the particular plan involved, may be driven rollers at both the feed and discharge ends, or the rollers at one end or the other may be idle rollers, so that this invention can be used with means for feeding a log to the log-manipulating mechanism irrespective of the particular structure this feed means may embody since any of the conventional log hauls known to industry can be utilized.

It is evident that various other structural forms embodying substitutions, eliminations, additions and combinations may be resorted to without departing from the broad function and scope of the appended claims and hence it is not wished to limit the invention in all respects to the exact and specific disclosures of the selected examples illustrated.

It is to be particularly pointed out that the triangular shape of the end link on the flails of Figure 8 is of substantial importance. As previously indicated and as shown in the drawings, the base of the triangular link strikes the log in debarking and upon impact there is a tendency for the triangular link to move into the link that it is connected to, thus the triangular link in operation will be supported at different times by different corners so that the several bases are available for debarking thus increasing the wear factor of this link. Centrifugal force will always ensure that one base of the triangular link will strike the log thus providing a larger area of impact than conventional oval or elongated links.

It is further to be pointed out that the spheroidal log-supporting feed elements are operative to properly position logs that are not cylindrical and which are crooked along their length or knotted since the control of the balls permits axial movement of a log back and forth until the optimum position for rotation of the log about its axis is obtained. Once this position has been reached, the debarking mechanism is traversed along the log from left to right in Figure 1.

Figure 13:
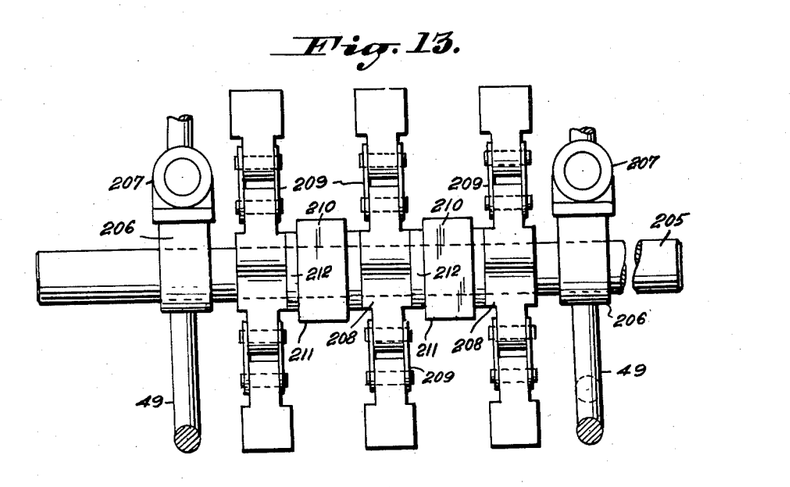
Figures 13 and 14 illustrates respectively in elevation and partial section a modified form of bark-removing elements.
Figure 14:
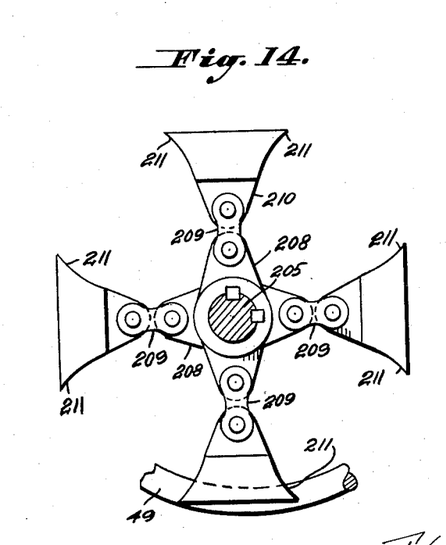

In Figures 13 and 14 is shown a modified form of bark-removing elements that can be used in lieu of chain flails. This form includes a shaft 205 that is journaled in pillow blocks at 206 which are connected to side elements 207 of the outer frame of the debarking head. While the Figure 13 shows tubular side frame elements 207, it is obvious that the channel members shown in Figures 8 and 9 can be used. Thus the shaft 205 can be mounted in lieu of either the shaft 47 or 147. Mounted on the shaft 205 are a plurality of pairs of articulated bark-removing tools. As shown each pair of tools includes a hub 208 splined to the shaft 205. Links 209 are respectively pivotally connected at one end to each opposite end of the hubs and at their other ends to a tool body 210.

The tool body has opposite edges 211 that are either "stellite" coated or which comprise cutter inserts. Alternatively a hardened-steel shell could be mounted over the tool body and incorporate the cutting edges. It is to be noted that spacers 212 separate the hubs and alternate hubs are staggered 90° about the shaft axis. The mounting of the tool bodies in pairs provides a dynamic balance and the tools chip the bark from the log. The effective radial length from the center of the shaft 205 to the edge 211 corresponds to the distance from the center of shaft 205 to the surface of the bar 49 that rides on or engages the wood of a log after bark has been removed. One bar 49 is shown in two positions in Figure 13, with the dotted-line showing illustrating the bar adjusted vertically for use in barking a log having bark approximately two inches thick.

The use of the bark-removing tools shown in Figures 13 and 14 varies somewhat as compared with the chain flails. In using the chain flails the log is fed from the right-hand end until the best available position for rotation on its axis has been determined having regard to knots and irregularities. The balls are driven counterclockwise as viewed from the right so that the log rotates clockwise and the flail shaft is rotated counterclockwise. With the log rotating on the feed mechanism the flail is traversed from left to right or reciprocated axially of the log to effect the best bark removal. In contradistinction to this arrangement, the cutting tools of Figures 13 and 14 are operated differently. With this modification, the logs are fed from the left and the drive to the balls is reversed so that the balls when the log has been stopped on the feed table are rotated clockwise to turn the log counterclockwise. Since the cutter shaft rotates counterclockwise, the successive leading edges 211 of the tool bodies will strike the log tangentially in a direction opposite to log rotation and penetrate the bark to the depth determined by the adjustment of the guard bar 49 which adjustment is correlated with the thickness of bark. Thus the cutters strike the bark as the bark aproaches the same to in effect chip the bark off the log whereas the flails would strike the bark as it passes therebeneath and in effect would abrade the bark or would destroy the frictional adherence between the bark and the wood at the cambium layer.

All forms of the bark-removing tool hereinbefore described have been operated to remove substantially over 90 percent of the bark from the log and as an example, logs from 14 to 20″ in diameter and 18 to 20′ long are debarked in from 8 to 20 seconds depending on the contour of the log. Of course a smaller-diameter log will be debarked more rapidly than one of larger diameter.

Figure 15:
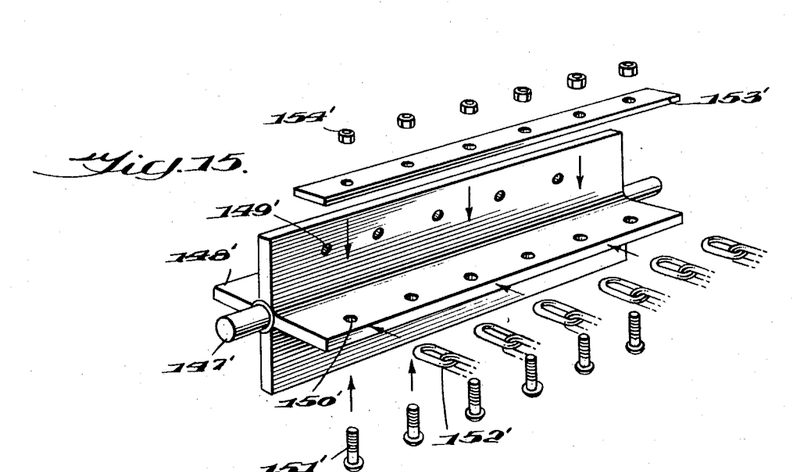
Figure 15 is a partial view in exploded perspective illustrating a further form of flail construction.
Figure 16:
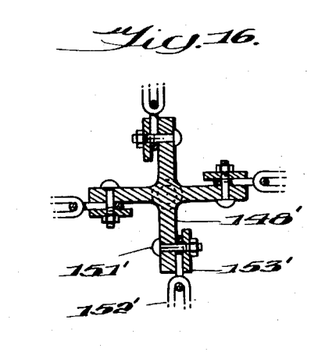
Figure 16 illustrates the form of flail construction shown in Figure 15 in cross section, and Figures 17, 18 and 19 respectively diagrammatically illustrate modified mechanism for simultaneously turning the ball elements about vertical axes.

The invention further comprehends additional modifications in the debarking tools per se. The modification shown in Figures 15 and 16 includes a shaft 147′ to be mounted in lieu of the shaft 147 or 205. This shaft has four radially extending, equispaced vanes 148′ along its length so that it resembles a paddle wheel. These vanes are so drilled that five equispaced apertures 149′ are provided in two opposite vanes and six equispaced apertures 150′ are provided through the other two opposite vanes. Cap screws 151′ are passed through each aperture and through an innermost link of a flail chain 152′ consisting of three seriate links. An apertured plate or bar 153′ is then passed over each row of cap screws and nuts 154′ clamp the bars against the innermost links of the chains to secure the rows of chains to the shaft. The rows of chains are thus staggered similar to the arrangement of the cutters in Figures 13 and 14 since the edge row that has five chain flails extending from the shaft has its flails positioned between the paths of rotation of adjacent flail chains of the rows that have six chains embodied therein.

Figure 17:
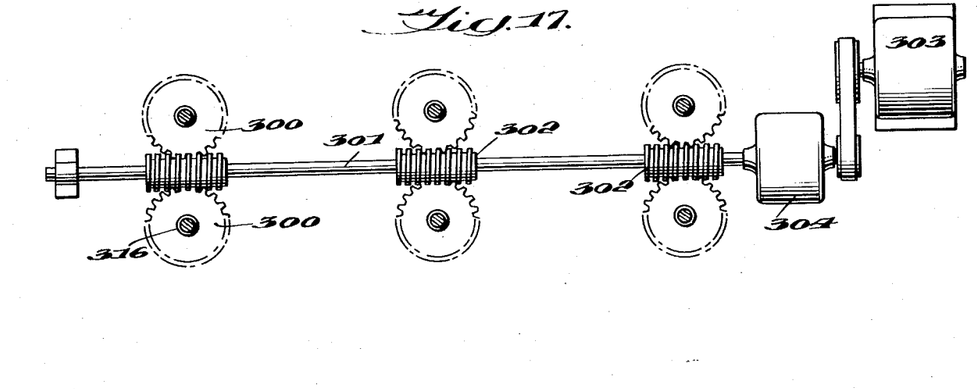

The invention contemplates modified forms of mechanism for turning the ball-supporting yokes about the vertical axes provided by the yoke-supporting sleeves such as 16 in Figure 3. Figure 17 illustrates one such modification in which each yoke-supporting sleeve 316 has a gear 300 mounted thereon in lieu of the levers 23 in the arrangement of Figures 1–3. A line shaft 301 is mounted to extend longitudinally of the axis of the log-handling mechanism at a position between the pairs of sleeves 316. This line shaft 301 has a plurality of longitudinally spaced worm sections 302 mounted or formed thereon. There is a worm section or gear 302 for each pair of ball arrangements and each worm section 302 is in mesh with the gears 300 carried by the respective pairs of vertical sleeves 316. A suitable means such as a reversible electric motor 303 is coupled to the line shaft 301 through a conventional speed-reducer unit 304 to rotate the line shaft 301 in opposite directions whereby the yokes, not shown, and thus the spheroidal ball elements that are carried thereby can be indexed through a distance of 360° in either direction.

Figure 18:
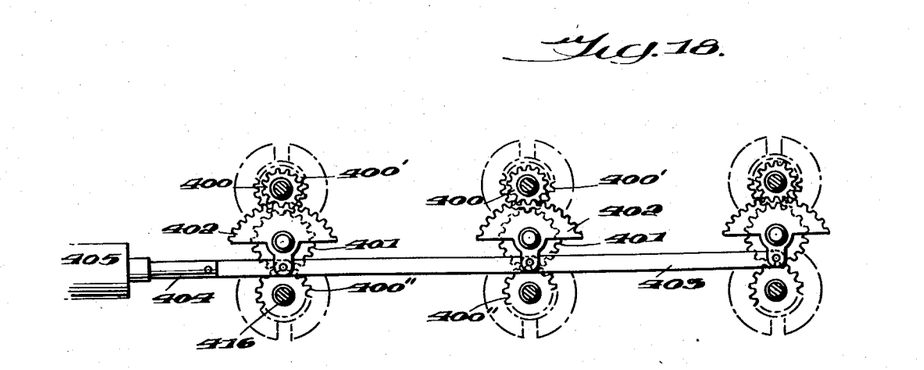

Figure 18 illustrates another arrangement for effecting complete 360° indexing of the balls. In this diagrammatic view each sleeve 416 has a gear mounted thereon. The gears on one side of the longitudinal axis of the log-handling mechanism are double gears and include the portions 400 and 400'. The gears on the other side of the longitudinal axis are single gears 400''. Intermediate gears 401 are journaled on vertical stub shafts and continuously engage, for each pair of yoke supporting sleeves, the gear 400'' on one side of the longitudinal axis and the gear portion 400' on the other side of the longitudinal axis. A sector gear 402 is journaled on each stub shaft that journals the intermediate gears. Each sector gear is in mesh with the gear portion 400 of the double gears. Levers 403 interconnect the sector gears for simultaneous movement and a piston 404 is pivotally connected at one end to either end sector gear at a point that is intermediate the opposite ends of of the sector gear. This piston is moved by a double-acting fluid motor 405. In this arrangement, the sector gears are so dimensioned that a swinging thereof in one direction or the other to the full stroke of the piston will effect a complete revolution of the yokes.

Figure 19:
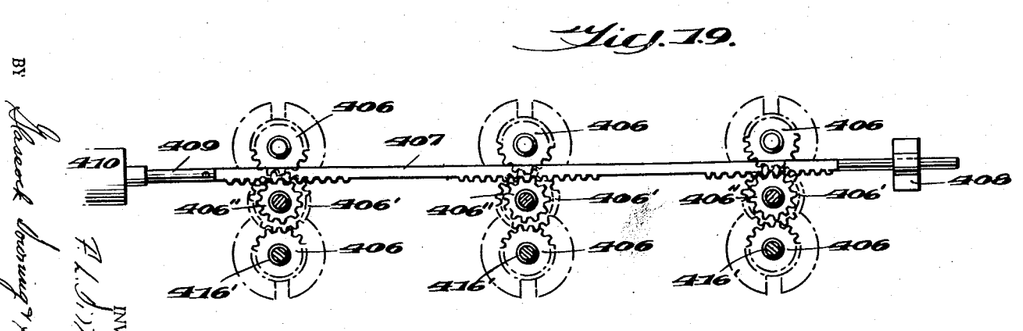

A further modification is shown in Figure 19 and includes an arrangement in which gears 406 are mounted on the yoke-supporting-and-turning sleeves 416'. An intermediate gear is arranged between the gears 406 on each pair of sleeves. This intermediate gear is a double gear including one gear portion 406' meshing with a pair of the gears 406 on the sleeves and another gear portion 406'' meshing with a portion of a rack bar 407. The rack bar is suitably guided as at 408 for longitudinal movement and is connected to or embodied on the end of a piston 409 of a double-acting fluid motor 410. In this arrangement, reciprocity of the rack bar will effect opposite rotations of the intermediate gear and thus coordinated rotation of the yokes. Each stroke of the piston and rack bar is sufficient to effect a 360° rotation of the yokes.

Therefore, the invention broadly comprehends means operably connected with each yoke to rotate the same in oppoiste directions and to simultaneously rotate the yokes of each pair in the same direction. From a broader standpoint, therefore, the invention contemplates means for turning each spheroidal element about a vertical axis comprising means for indexing the same through 360° in either direction.

What is claimed is:

1. A debarking machine comprising in combination a log-manipulating and supporting frame including spaced supporting and feeding means for selectively feeding a log longitudinally thereof while restraining the same against rotation, feeding such log longitudinally in either direction while rotating it about its axis, or rotating such log about its axis while restraining it against longitudinal movement, a trackway extending longitudinally of, to one side of and above said frame, said trackway being substantially longer than the longitudinal extent of said first-mentioned frame, a carriage movable along said trackway in rolling contact therewith, means including flexible force transmitting means operably connected to the carriage for moving the carriage back and forth along the trackway to operably position the carriage with relation to a log being manipulated on the frame, a second frame and including laterally spaced uprights and arm means connected thereto carried by the carriage and extending transversely of the trackway and overlying the first-mentioned frame when the carriage is moved along the trackway, debarking means carried by said arm means, power imparting means carried by said second frame means and operably connected to said debarking means for actuating the same and means for moving the arm means toward and away from the axis of a log manipulated on the first-mentioned frame to place the debarking means in contact with such log.

2. A debarking machine comprising in combination a log-manipulating and supporting frame including spaced supporting and feeding means for selectively feeding a log longitudinally thereof while restraining the same against rotation, feeding such log longitudinally in either direction while rotating it about its axis, or rotating such log about its axis while restraining it against longitudinal movement, a trackway extending longitudinally of, to one side of and above said frame, said trackway being substantially longer than the longitudinal extent of said first-mentioned frame, a carriage movable along said trackway in rolling contact therewith, means for moving the carriage back and forth along the trackway to operably position the carriage with relation to a log being manipulated on the frame, a second frame carried by the carriage and extending transversely of the trackway and overlying the first-mentioned frame when the carriage is moved along the trackway, debarking means carried by said second frame, means for moving the second frame toward and away from the axis of a log manipulated on the first-mentioned frame to place the debarking means in contact with such log, and said second frame being pivotally connected to the carriage for movement about two axes at right angles to one another and one of which is parallel with the trackway.

3. A debarking machine as claimed in claim 2, including means for vertically adjusting the position of the second frame relative to the axis of such log independently of the means for moving the second frame toward and away from the axis of such log, and means for moving the second frame toward and away from the axis of a log including fluid motor means.

4. A log debarking apparatus as claimed in claim 2, in which spaced supporting means extend above the carriage means, and in which said two axes at right angles to one another are provided by a first pivot means carried by said supporting means and extending perpendicular to a line parallel to the axis of said trackway, a second pivot means supported by the first pivot means and extending parallel to said trackway, and means connecting said frame to said second pivot means.

5. A debarking machine comprising in combination a log-manipulating and supporting frame including spaced supporting and feeding means for selectively feeding a log longitudinally thereof while restraining the same against rotation, feeding such log longitudinally while rotating it about its axis or rotating such log about its axis while restraining it against longitudinal movement, a trackway extending longitudinally of, to one side of, and above said frame, a carriage movable along said trackway, means for moving the carriage back and forth along the trackway to operably position the carriage with relation to a log being manipulated on the frame, a second frame operatively associated with the carriage, extending transversely of the trackway and overlying the first-mentioned frame when the carriage is moved along the trackway, debarking means carried by said second frame, means for moving the second frame toward and away from the axis of a log manipulated on the first-mentioned frame to place the debarking means in contact with such log, said second frame being pivotally supported by pivot means movable with the carriage to permit said movement of the second frame toward and away from the axis of a log supported on the first-mentioned frame, a supplementary frame mounting the debarking means, and means connecting the supplementary frame to the second frame for free pivotal movement about an axis perpendicular to a line parallel to the axis of said pivot means.

6. A debarking machine comprising in combination a log-manipulating and supporting frame including spaced supporting and feeding means for selectively feeding a log longitudinally thereof while restraining the same against rotation, feeding such log longitudinally while rotating it about its axis or rotating such log about its axis while restraining it against longitudinal movement, a trackway extending longitudinally of, to one side of, and above said frame, a carriage movable along said trackway, means for moving the carriage back and forth along the trackway to operably position the carriage with relation to a log being manipulated on the frame, a second frame operatively associated with the carriage, extending transversely of the trackway and overlying the first-mentioned frame when the carriage is moved along the trackway, debarking means carried by said second frame, means for moving the second frame toward and away from the axis of a log manipulated on the first-mentioned frame to place the debarking means in contact with such log, a slide mounted on the carriage for vertical movement relative thereto, said second frame being carried by said slide, and said means for moving the second frame toward and away from the axis of a log including a tilting means which is connected between said slide and said second frame, and a raising-and-lowering means for moving the slide and thus the second frame vertically relative to said carriage.

7. A log-debarking apparatus comprising a trackway, a carriage means movable along said trackway, means for moving the carriage means back and forth along the trackway in the direction of its length for operatively positioning the carriage means in relation to a log to be debarked, such log being disposed with its axis parallel to the trackway, a frame operatively associated with the carriage means for movement therewith and extending transversely of the trackway and overlying such log, debarking means carried by said frame, means including a pivot having its axis parallel to the trackway and mounting said frame relative to the carriage means for movement toward and away from the axis of a log to be debarked, means for moving the frame toward and away from the axis of a log to be debarked, a supplementary frame mounting the debarking means, and means connecting the supplementary frame to the first-mentioned frame for free pivotal movement about an axis perpendicular to a line parallel to the axis of said pivot.

8. A log-debarking apparatus as claimed in claim 7 in which said trackway includes a channel member having horizontally extending flange means facing away from a log to be debarked, and the means for moving the carriage means along the trackway including flexible force transmitting means operably connected to the carriage means and housed within said channel member.

9. A log-debarking apparatus as claimed in claim 7, and a shaft carried by said frame, and extending transversely thereof adjacent said supplementary frame, lift finger means connected to said shaft for movement therewith and including a lifting nose underlying a part of said supplementary frame, said lift finger means including an opposite end extending between said shaft and toward said trackway, piston means engageable with at least one of said opposite ends of said lift finger means, and means controlling said piston means to limit the pivotal movement of the supplementary frame relative to said first-mentioned frame and for locking the supplementary frame relative to said first-mentioned frame.

10. A log-debarking apparatus comprising a trackway, a carriage means movable along said trackway, means for moving the carriage means back and forth along the trackway in the direction of its length for operatively positioning the carriage means in relation to a log to be debarked, such log being disposed with its axis parallel to the trackway, a frame operatively associated with the carriage means for movement therewith and extending transversely of the trackway and overlying such log, means for moving said frame toward and away from the axis of a log to be debarked, debarking means carried by said frame, a slide mounted on the carriage means for vertical movement relative thereto, said frame being carried by said slide, and said means for moving the frame toward and away from the axis of a log including a tilting means connected between said slide and said frame, and a raising-and-lowering means for moving the slide and thus the frame vertically relative to said carriage means.

11. A log-debarking apparatus as claimed in claim 10, in which said tilting means and said raising-and-lowering means each include fluid motor means.

12. A log-debarking apparatus as claimed in claim 10 in which a pair of supporting plates project from the rear face of the upper part of said slide, pivot means carried by said supporting plates at a level above the trackway for supporting said frame, said slide including a transverse brace beneath said supporting plates, fluid motor means operatively connected between the carriage means and the lower side of said transverse brace and constituting said raising-and-lowering means, and additional fluid motor means operably connected between the upper side of said transverse brace and said frame and constituting said tilting means.

References Cited in the file of this patent

UNITED STATES PATENTS

| | | |
|---|---|---|
| 1,379,768 | Larson | May 31, 1921 |
| 2,552,526 | Darwin | May 15, 1951 |
| 2,596,187 | Watts et al. | May 13, 1952 |
| 2,599,962 | Williford | June 10, 1952 |
| 2,601,261 | Carpenter | June 24, 1952 |
| 2,681,670 | Prentice | June 22, 1954 |
| 2,713,365 | Rautnig | July 19, 1955 |
| 2,755,829 | Streed et al. | July 24, 1956 |

FOREIGN PATENTS

| | | |
|---|---|---|
| 7,345 | Sweden | Dec. 5, 1896 |
| 135,165 | Sweden | Apr. 8, 1952 |
| 635,417 | France | Dec. 27, 1927 |
| 1,050,526 | France | Sept. 2, 1953 |
| 542,051 | Canada | June 11, 1957 |